US012607728B2

(12) United States Patent
Dassler et al.

(10) Patent No.: US 12,607,728 B2
(45) Date of Patent: Apr. 21, 2026

(54) LIDAR SYSTEM AND METHOD FOR RECOGNIZING A CONTAMINATION OF A BEAM PATH OF A LIDAR SYSTEM

(71) Applicant: Robert Bosch GmbH, Stuttgart (DE)

(72) Inventors: Aron Dassler, Ditzingen (DE);
Christian Graef, Ludwigsburg (DE);
Felix Christian Abrecht, Nagold (DE);
Helmut Kramer, Mainbernheim (DE);
Joao Pedro Ribeiro, Oporto (PT);
Miguel Mendes, Pombal (DE);
Nikolaus Moehler, Boeblingen (DE);
Patrick Volz, Stuttgart (DE)

(73) Assignee: ROBERT BOSCH GMBH, Stuttgart (DE)

( * ) Notice: Subject to any disclaimer, the term of this patent is extended or adjusted under 35 U.S.C. 154(b) by 1021 days.

(21) Appl. No.: 17/738,664

(22) Filed: May 6, 2022

(65) Prior Publication Data

US 2022/0365188 A1      Nov. 17, 2022

(30) Foreign Application Priority Data

May 14, 2021      (DE) ...................... 10 2021 204 904.4

(51) Int. Cl.
| | |
|---|---|
| *G01S 7/497* | (2006.01) |
| *B08B 3/02* | (2006.01) |
| *B08B 13/00* | (2006.01) |
| *G01S 7/481* | (2006.01) |

(52) U.S. Cl.
CPC ............ *G01S 7/497* (2013.01); *G01S 7/4817* (2013.01); *B08B 3/02* (2013.01); *B08B 13/00* (2013.01); *G01S 2007/4975* (2013.01)

(58) Field of Classification Search
CPC ................. G01S 2007/4975; G01S 2007/4977
See application file for complete search history.

(56) References Cited

U.S. PATENT DOCUMENTS

| | | | |
|---|---|---|---|
| 2020/0180569 A1* | 6/2020 | Seo ........................... | B60S 1/56 |
| 2021/0302582 A1* | 9/2021 | Liu .......................... | G01S 17/93 |
| 2022/0390568 A1* | 12/2022 | Kubota ................... | G01S 17/89 |

FOREIGN PATENT DOCUMENTS

| | | |
|---|---|---|
| DE | 19717399 A1 | 6/1999 |
| DE | 102018008442 A1 | 3/2019 |
| DE | 102019121416 A1 | 2/2020 |
| DE | 102018215221 A1 | 3/2020 |

(Continued)

*Primary Examiner* — Thanh Luu
(74) *Attorney, Agent, or Firm* — NORTON ROSE FULBRIGHT US LLP

(57) ABSTRACT

A LIDAR system. The LIDAR system includes a light transmitting unit and a light receiving unit. A beam path is formed between the light transmitting unit and the light receiving unit of the LIDAR system, in order to optically scan surroundings of the LIDAR system during the operation of the LIDAR system. The LIDAR system is configured to recognize a contamination of the beam path, based on LIDAR measured data, which have been obtained during the optical scanning of the surroundings. A method for recognizing a contamination of a beam path of a LIDAR system is described, including recognizing the contamination by the LIDAR system based on LIDAR measured data, which have been obtained during an optical scanning of surroundings of the LIDAR system.

12 Claims, 4 Drawing Sheets

(56)     References Cited

FOREIGN PATENT DOCUMENTS

| DE | 102018126592 | A1 | 4/2020 |
|----|--------------|----|--------|
| DE | 102018217488 | A1 | 4/2020 |
| DE | 102019129332 | A1 | 4/2020 |
| DE | 102019209846 | A1 | 1/2021 |

* cited by examiner optically scan surroundings    S31 recognize contamination    S32

LIDAR SYSTEM AND METHOD FOR RECOGNIZING A CONTAMINATION OF A BEAM PATH OF A LIDAR SYSTEM

FIELD

The present invention relates to a LIDAR system, which includes a light transmitting unit and a light receiving unit, a beam path being formed between the light transmitting unit and the light receiving unit of the LIDAR system, in order to optically scan surroundings of the LIDAR system during the operation of the LIDAR system, and the LIDAR system being configured to recognize a contamination of the beam path.

The present invention further relates to a method for recognizing a contamination of a beam path of a LIDAR system.

BACKGROUND INFORMATION

A LIDAR system (LIDAR=Light Detection and Ranging) is a three-dimensional optical measuring system, which scans its surroundings with a light source, normally an infrared laser source. The surroundings are scanned at defined angles (for example, horizontally and vertically). For each angle, the distance to objects that reflect the light is measured. Using these pieces of information, a three-dimensional point cloud is created. Since it is an optical measuring method, each artefact in the light path, i.e., in the beam path, influences the measured result of the LIDAR system. The LIDAR system is normally a hermetically sealed system including an optically transparent cover glass, which is set into the beam path.

An optical system, in particular, a LIDAR system, is described in German Patent Application No. DE 10 2018 217 488 A1, including a primary optical sensor, which is protected from environmental influences by an optically transparent protective covering, the optical system including a contamination recognition system, the contamination recognition system including at least one optical transmitting unit and at least one optical receiver unit. The subject matter of this publication allows for the detection and/or cleaning of contaminations on the protective covering of an optical sensor, for example, of a LIDAR sensor, of a camera or of a combination of a camera and a LIDAR sensor behind a shared protective covering.

German Patent Application No. DE 10 2018 215 221 A describes that a wetting or contamination due to particles of any type that have settled on the cover glass of an optoelectronic 3D sensor may be recognized. The optoelectronic 3D sensor in this case may, for example, be a LIDAR sensor in the form of a macro-scanner or micro-scanner or a solid state system. According to this publication, particles, for example, in the form of rain, dirt, oil, etc., may settle on the cover element under varying circumstances and may adversely influence or even render impossible an operability of the optoelectronic sensor. Thus, it is provided in this publication to detect vibrations of the cover element with the aid of a detection device functionally connected to the cover element and to evaluate these with the aid of an evaluation unit.

German Patent Application No. DE 10 2018 008 442 A1 describes a method for weather recognition and/or visibility range recognition. The document mentions that LIDAR sensors may be exposed to difficult surroundings conditions, for example, dirt. German Patent Application No. DE 10 2019 121 416 A1 describes a navigation system for a machine. The machine may include a plurality of proximity sensors in order to generate three-dimensional point clouds of the surroundings of the machine. It is mentioned as a general problem that if these proximity sensors are optical sensors, dirt or other impurities on the objective lens may interfere with the detection.

A corrective lens for an optical system is described in German Patent Application No. DE 10 2019 129 332 A1, which includes a translucent cover element, which may be a parallel plate with no significant refractive power such as, for example, a cover glass, which is provided on an objective lens side of an image plane of a solid state image sensor.

SUMMARY

According to the present invention, a LIDAR system of the aforementioned type is provided, the LIDAR system being configured to recognize the contamination based on LIDAR measured data obtained during the optical scanning of the surroundings.

There are already various approaches for recognizing contaminations, in particular, on the cover glass, and for using these to estimate the reduction of the optical permeability, i.e., transmittance. The present invention disclosed herein has multiple advantages over these existing approaches. No additional hardware is required, only a software-based method. A utilization of already present LIDAR measured data takes place, which are obtained already by the optical scanning of the surroundings by the LIDAR system. Since this optical scan provides the LIDAR measured data, which are already used in the LIDAR system, for example, for the perception or detection of depth data, it is more meaningful to also ascertain the quality of these LIDAR measured data directly from the same optical scan data.

The light transmitting unit includes preferably one or multiple light sources, in particular, laser emitters. It may be infrared laser emitters. The light receiving unit includes preferably one detector array, which includes one or multiple detectors, in particular, avalanche photodetectors. The LIDAR system may include optical components in the beam path such as, in particular, mirrors and lenses, in order to direct the light emitted by the light transmitting unit into the surroundings and to direct the light reflected in the surroundings onto the light receiving unit. The optical components are situated within the LIDAR system, in particular, between the light source and the cover glass and/or between the light receiving unit and the cover glass. The beam path starts at the light transmitting unit and ends at the light receiving unit. At least a portion of the light on the beam path emitted by the light transmitting unit passes via the surroundings to the light receiving unit. A remaining portion of the light may be absorbed on the beam path or may be directed by optical components of the LIDAR system that include the contamination to the light receiving unit, without having previously passed through the surroundings.

In accordance with an example embodiment of the present invention, it is preferred that the LIDAR system is configured to recognize the contamination based on point cloud data, which has been determined from the LIDAR measured data. The LIDAR system is configured or may be configured to obtain pieces of information, in particular, pieces of depth information, from the point cloud data about the surroundings. The pieces of depth information may be used to determine a distance between the LIDAR system and objects in the surroundings. Since these point cloud data are created anyway in order to obtain the pieces of information about the surroundings, the point cloud data may be introduced to a further use by the approach provided herein, namely, to assess the quality of the point cloud data, which may be a function of the contamination of the beam path.

LIDAR measured data may be collected, recorded over a period of time and used for forming a histogram, the histogram normally including classes (bins). Such LIDAR measured data may be raw LIDAR-measured data, also referred to as raw-LIDAR-measured data, or also processed raw-LIDAR-measured data already processed by the LIDAR system. The LIDAR measured data normally exhibit a certain scatter over time, even when the objects in the surroundings do not change with respect to their distance to the LIDAR system. An averaging via LIDAR measured data may therefore be provided prior to the recognition of the contamination, which may be implemented by the formation of the histogram from the LIDAR measured data. Point cloud data may be extracted from these histograms.

In accordance with an example embodiment of the present invention, the LIDAR measured data preferably include measured far points and near points, the near points being recognized within a predetermined distance from the LIDAR system, which is shorter than a distance of the far points from the LIDAR system, and the LIDAR system being configured to use the near points in order to recognize the contamination. The contamination is located in the LIDAR measured data normally close to the LIDAR system, compared to the objects in the surroundings. Thus, it may be expedient for the LIDAR system to be configured to consider the near points as indications of contamination present in the beam path. In contrast thereto, the far points may be classified as reflections of the objects in the surroundings. Near points and far points form preferably together valid points of the LIDAR measured data. Accordingly, the measured data may also contain invalid points, which stem, for example, from interference light sources, which are not part of the LIDAR system, for example, from the sun or from detector noise. In other words, valid points may thus refer, in particular, to the LIDAR measured data that represent reflections of the light emitted by the light transmitting unit during the operation of the LIDAR system. In one other specific embodiment, a tile size may be based by the LIDAR system on the recognition of the contamination. The point cloud data may be subdivided into spatial segments. In this case, each segment may be assigned a maximum number of points, which is system-related. This maximum number is referred to as the tile size. The number of all possible points may include the valid points and the invalid points. Some specific embodiments provide that the LIDAR system is configured, in particular, to determine the number of near points divided by the number of possible points in an angular range in order to recognize the contamination. Several specific embodiments provide that the LIDAR system is configured to determine the number of near points divided by the number of valid points in order to recognize the contamination.

It is preferred that a ratio between an intensity of the near points divided by the number of valid points is used by the LIDAR system in order to recognize the contamination. In some specific embodiments, however, a ratio between the intensity of the near points divided by the number of all possible points is used by the LIDAR system in order to recognize the contamination. A diagram may, in particular, be generated by the LIDAR system, in which a standard deviation of the distance of the near points to the LIDAR system may be plotted against the transmittance in order to recognize the contamination. In alternative specific embodiments, a ratio of the near points to the tile size may be used by the LIDAR system in order to recognize the contamination. In this case, it may be problematic if the ratio is 1, since it may not become greater. In one further specific embodiment, an average intensity of the near points may be used by the LIDAR system in order to recognize the contamination. In yet another specific embodiment, a standard deviation of the intensity may be used in order to recognize the contamination. In still one other specific embodiment, a standard deviation of the distance of the near points to the LIDAR system may be used in order to recognize the contamination. Some specific embodiments provide that the LIDAR system is configured to use a standard deviation of the received pulse widths of the near points. Many further characteristics of the near points have been found as a possible criterion, further useful criteria of the near points may be expected. In specific embodiments, an intensity maximum of the LIDAR measured data may, in particular, also be determined by the LIDAR system, i.e., how many photons from the surroundings have returned, and the intensity maximum may be used in order to recognize the contamination. It may, in particular, be an intensity maximum of the near points. All aforementioned data may be obtained from the LIDAR measured data and are easily available, since the LIDAR measured data are collected anyway for a basic function of the LIDAR system, in particular, a depth measurement of the surroundings.

In some specific embodiments of the present invention, the near points according to the point cloud data exhibit a distance of 1 cm to 100 cm to the LIDAR system. Greater distances are normally reserved for objects in the surroundings, which during operation rarely approach the LIDAR sensor closer than 100 cm, for which reason distances of 100 cm and more are generally not to be assessed as contamination in the beam path. It is preferred, however that near points at a distance between 10 cm and 75 cm to the LIDAR system are recognized by the LIDAR system in the point cloud data as contamination. This represents a sufficiently narrow range in order for objects that are not contamination, not to be inadvertently classified by the LIDAR system erroneously as contamination.

The contamination is preferably situated on a section of the beam path situated within the LIDAR system. Such contaminations may indicate a production problem, for which reason their recognition may be particularly important. Optical components such as, for example, mirrors or lenses, of the LIDAR system, in particular, may exhibit the contamination. This is then registered in the LIDAR measured data as near points comparatively close to the LIDAR system, possibly at a distance of 1 cm to 10 cm away from the LIDAR system. The LIDAR system may then preferably trigger an alert to have an internal cleaning of the LIDAR system performed, for example, via a visual or acoustic warning to a user.

In accordance with an example embodiment of the present invention, it is preferred that the contamination is situated on a section of the beam path situated outside the LIDAR system. Such contaminations may severely impair the functions of the LIDAR system, but be easily removable if they are recognized. The contamination may, in particular, be present outside on an optically transparent outer covering of the LIDAR system, through which the beam path extends. Outside means here on a surface, which faces the surroundings or, in other words, which faces away from the light transmitting unit. The LIDAR system may then recognize this exterior contamination and trigger either the alert or a cleaning directly. The cleaning may take place automatically with the aid of cleaning devices such as, in particular, water nozzles or wipers until the LIDAR measuring points assigned to the contamination are no longer present or are significantly less present. The contamination on a section of the beam path situated outside the LIDAR system is registered in the LIDAR measured data as a near point generally comparably far away from the LIDAR system, possibly at a distance of 10 cm to 75 cm away from the LIDAR system. Thus, a contamination within or outside the LIDAR system may be at least generally differentiated by the LIDAR system.

Some specific embodiments of the present invention provide that the LIDAR system is configured to recognize the contamination located on a cover glass of the LIDAR system. Cover glasses of LIDAR systems, in particular, show regularly contaminations as a result of dirt from the surroundings, which should be removed in order to ensure the reliable operation. The cover glass is a preferably optically transparent outer covering of the LIDAR system. The contamination may be located on an inner side of the cover glass facing away from the surroundings, i.e., within the LIDAR system or, in other words, on the cover glass facing the light transmitting unit. The contamination of the cover glass may, however, also be located on an outer side of the cover glass facing the surroundings, i.e., outside the LIDAR system. The LIDAR system may, in particular, be configured to activate the light receiving unit with a time delay after the light transmitting unit in order to ignore initial and potentially particularly strong reflections that may form as a result of multiple reflections on the cover glass. Reflections of the cover glass themselves being erroneously recognized as contamination by the LIDAR system may thus be avoided.

However, not only the contamination, but also the condition of the cover glass itself has an influence on the transmission of light through the cover glass, so that reflections of the cover glass may appear in the point cloud data, even when the cover glass is not contaminated at all. Accordingly, the influence of the cover glass should be initially determined in the preferred method in order to ensure reliable LIDAR measured data. This may be achieved in specific embodiments by carrying out a calibration, in which the transmission characteristics of a clean cover glass are initially determined, either by the LIDAR system itself or in advance on a testing unit in the factory. For this reason, the LIDAR system in specific embodiments may estimate the transmission reduction as a result of the contamination (such as, for example, one or multiple of dust, sand, water, ice, and salt) on the cover glass, since these reduce the visual range of the LIDAR system, because they reduce the intensity of the light on the beam path. With this piece of information, the LIDAR system is preferably able to determine the quality of the point cloud data and to establish the request to clean the glass. All of this should preferably be a software function, which utilizes already available data, such as the sensor point cloud data. A simple approach is thereby achieved, which estimates the degree of transmission preferably with only one (or few) frame(s). This allows for a recognition of contamination and an estimate of the consequent transmission reduction.

The LIDAR system is preferably configured to compare an optical actual transmittance, in particular, of the cover glass, based on the LIDAR measured data with an optical setpoint transmittance, in particular, of the cover glass, in order to recognize the contamination of the cover glass. Thus, a clean setpoint original state of the LIDAR system may be compared with a present actual state of the LIDAR system, in order to recognize the contamination of the cover glass. The setpoint transmittance preferably indicates a state, in which no contamination of the beam path, in particular, of the cover glass, is present. The setpoint transmittance is determined, in particular, by the aforementioned calibration. It is preferred in this case to generate a setpoint set of point cloud data with a clean cover glass and to store it, in particular, in the LIDAR system in order to compare this setpoint set during operation with an actual set. If the actual set deviates from the setpoint set with respect to the near points in the setpoint set, the LIDAR system may take this in specific embodiments as an indication that the cover glass—or an optical component within the LIDAR system— is contaminated. In other words, therefore, an actual state may be compared with a setpoint state and a deviation from the setpoint state may be easily recognized. The deviation may be indicated, in particular, in percentages. If a predetermined threshold value of the deviation as an absolute value or else in percentage is exceeded, in particular, a value of greater than 20%, 30% or also 50% compared to the setpoint transmittance, the LIDAR system in specific embodiments may instruct a cleaning device to carry out a cleaning process of the LIDAR system with the aid of the cleaning device. The cleaning device may be a water nozzle or a wiper, configured, in particular to clean the cover glass of the LIDAR system on the side facing the surroundings. The cleaning may be continued by the LIDAR system as long as the threshold value continues to be exceeded.

As explained, it is thus preferably a LIDAR system for recognizing and estimating a severity and location of a contamination on a protective covering of the LIDAR system. The LIDAR system utilizes preferably LIDAR measured data in order to recognize and to estimate the contamination. The protective covering may be a glass cover.

According to the present invention, a method for recognizing a contamination of a beam path of LIDAR system is further provided, a recognition of the contamination based on LIDAR measured data, which are obtained in an optical scan of surroundings of the LIDAR system, being provided by the LIDAR system.

There are various approaches for recognizing contaminations, in particular, on the cover glass and using them to estimate the reduction of the optical permeability. The present invention disclosed herein has multiple advantages compared to these existing approaches. No additional hardware is required, only a software-based method. A utilization of already present LIDAR measured data takes place. Since the optical scan provides the LIDAR measured data, which are used in the LIDAR system anyway (for example, for the perception or for depth data), it is more meaningful to also ascertain the quality of these LIDAR measured data directly from these optical scan data.

In specific embodiments of the method of the present invention, a determination of an actual transmittance of a cover glass of the LIDAR system may further be provided by the LIDAR system using near points from point cloud data, which have been determined from the LIDAR measured data of the LIDAR system in order to recognize the contamination. Cover glasses of LIDAR systems are particularly frequently contaminated, for which reason it is meaningful to monitor their state of contamination. The point cloud data are normally collected anyway for the function of the LIDAR system in order to obtain pieces of information about the surroundings, so that the point cloud data are able to assume an additional function. The actual transmittance may be compared with a previously determined setpoint transmittance with a clean cover glass in order to be able to prompt a cleaning of the cover glass by the LIDAR system, in particular, automatically using cleaning devices, when a threshold value is exceeded. The set-point transmittance may be ascertained with the aid of an implementation of a calibration previously described above.

It is preferred that the LIDAR system initially receives raw-LIDAR-measured data in the form of a histogram. The LIDAR system may subsequently compare the histogram raw LIDAR measured data with a threshold curve. It may be subsequently provided that the LIDAR system extracts the point cloud data points from the histogram.

One possible method, which is preferred, is explained below. Certain aspects herein are found again, which are described in detail above. The present invention is not, however, limited to the described specific embodiment of the method.

The severity or the degree of a cover glass contamination may be estimated by an evaluation of the point cloud data. This enables a recognition of the contamination by the LIDAR system based on LIDAR measured data, which are obtained during an optical scanning of surroundings of the LIDAR system. The properties of the points, in particular, located close to the sensor, i.e., the near points, provide pieces of information about the cover glass transmission.

The characteristic of the near points may be largely a function of the cover glass. However, this dependency may be preferably compensated for by a cover glass-specific calibration, which may take place, in particular, using a setpoint set of point cloud data as described above, as compared to an actual set. Thus, a determination of an actual transmittance of a cover glass of the LIDAR system using near points from point cloud data, which include the LIDAR measured data of the LIDAR system, may be utilized by the LIDAR system in order to recognize the contamination.

In accordance with an example embodiment of the present invention, the LIDAR system is preferably configured to recognize up to three artefacts per laser transmitting direction, since the light receiving unit generally provides only three echoes per histogram. In the event of a contamination on the cover glass, the first echo is seen very close to the ego sensor (in particular, <100 cm distance, preferably <75 cm distance), whereas the second and third echo may contain pieces of information about the real objects in the scene. The artefacts generated by the contamination are, however, normally located at an actual distance of, for example, less than 10 cm. As a result of multiple reflection of the laser light at internal optical systems (for example, reception filters and lenses) or mechanical elements, the associated echo is found at distances between 10 cm and 100 cm or 10 cm and 75 cm in the histogram or in the point cloud when the contamination is situated on a section of the beam path, which is situated outside the LIDAR system, for example, on an outer surface of the cover glass facing the surroundings. In contrast, if the contamination is situated on a section of the beam path situated within the LIDAR system, for example, on an inner surface of the cover glass facing away from the surroundings or from optical components of the LIDAR system, the echo associated with the contamination may be found at comparatively shorter distances between, in particular, 1 cm and 10 cm in the histogram or in the point cloud. The method may provide to determine, based on the distances of the near points from the LIDAR system, whether a contamination is situated on the section of the beam path situated within the LIDAR system, or is situated on the section of the beam path situated outside the LIDAR system, preferably by comparing the distances ascertained based on the point cloud data with a predetermined first distance limiting value, in particular, 10 cm. If the first distance limiting value falls short, a contamination may be determined by the LIDAR system, which is situated on the section of the beam path situated within the LIDAR system. Thus, an unnecessary cleaning of the outside of the cover glass may be avoided in order not to unnecessarily strain the latter. A second distance limiting value, which is greater than the first distance limiting value and which is, for example, between 10 cm and 15 cm, may be recognized as an indication of exterior contamination. If the second distance limiting value is exceeded, the LIDAR system may recognize the echo as being associated with an object in the surroundings.

As study candidates, two cover glasses have been partially contaminated with ISO Arizona dust in tests of the present invention. The contamination has been applied in multiple iterations, the optical degree of transmission has then been measured and the point cloud of a defined test link, i.e., test surroundings, have been recorded. For each point cloud scan, the mean value of multiple near point characteristics have been calculated (points at a distance to the LIDAR system <75 cm). These mean values have subsequently been plotted in the measured transmission value. In this way, it was possible to reliably detect the contamination of the cover glass.

Further specific embodiments and their advantages result, with the necessary changes having been made, based on the above explanations regarding the LIDAR system according to the present invention, to which reference is made in full at this point in order to avoid repetitions. The above described LIDAR system is preferably configured to carry out the method described herein in one or in multiple specific embodiments. For this purpose, the LIDAR system preferably includes a microprocessor, which is configured to carry out the method in the form of program code, which may be preferably stored on a memory of the LIDAR system to be executed.

As explained, it is thus preferably a method for recognizing and estimating a severity and location of a contamination on a protective covering of a LIDAR system. The method utilizes preferably LIDAR measured data in order to recognize and to estimate the contamination. The protective covering may be a cover glass.

Advantageous refinements of the present invention are disclosed here.

BRIEF DESCRIPTION OF THE DRAWINGS

Exemplary embodiments of the present invention are explained in greater detail with reference to the figures and to the following description.

DETAILED DESCRIPTION OF EXAMPLE EMBODIMENTS

Figure 1:
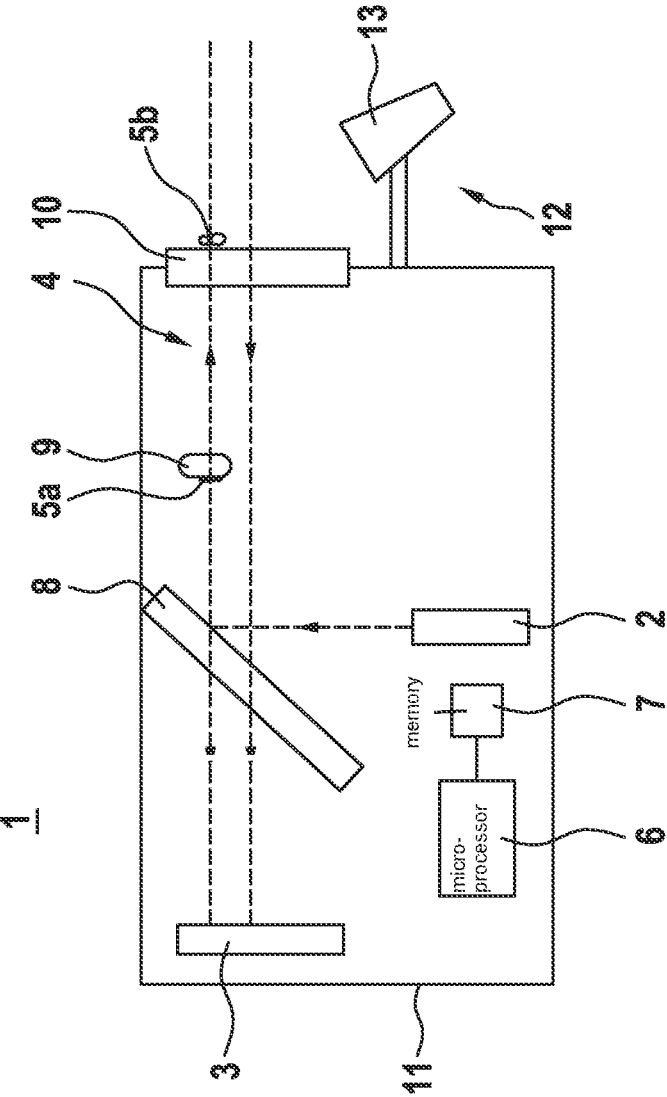
FIG. 1 shows an exemplary schematic structure of a LIDAR system according to the present invention.

An exemplary schematic structure of a LIDAR system 1 according to the present invention is shown in FIG. 1. LIDAR system 1 includes a light transmitting unit 2 and a light receiving unit 3. A beam path 4 is formed between light transmitting unit 2 and light receiving unit 3 of LIDAR system 1 in order to optically scan surroundings of LIDAR system 1 during the operation of LIDAR system 1. LIDAR system 1 is, as will be explained below, configured to recognize a contamination 5a, 5b of beam path 4. For this purpose, LIDAR system 1 includes a microprocessor 6, which is configured to carry out a method for recognizing contamination 5a, 5b of beam path 4 of LIDAR system 1 in the form of a program code, which is stored on memory 7 of LIDAR system 1 to be executed. LIDAR system 1 in the exemplary specific embodiment from FIG. 1 further includes a semi-transparent mirror 8, a beam forming unit 9 in the form of a lens, a cover glass 10, a housing 11 and a cleaning device 12 attached at the housing, which includes a water nozzle 13, which is directed at cover glass 10. In specific embodiments not shown, some of the aforementioned elements may be missing or additional elements may be present without adversely affecting the basic operability of the present invention.

LIDAR system 1 is configured to recognize contamination 5a, 5b based on LIDAR measured data, which are obtained during the optical scanning of the surroundings. Thus, the LIDAR measured data, which are collected by LIDAR system 1 anyway, for example, for obtaining a piece of depth information, may also be used to recognize contamination 5a, 5b. Thus, additional contamination recognition devices may therefore be omitted in this LIDAR system 1 and the method according to the present invention.

In order to scan the surroundings, light transmitting unit 2, which is formed here, for example, by an infrared laser source, transmits a light beam along beam path 4 via mirror 8 and beam forming unit 9 through cover glass 10 of housing 11 into the surroundings. There, the light beam is reflected at objects (not shown) and passes through cover glass 10 back into housing 11, passes mirror 8 and strikes light receiving unit 3, which contains multiple avalanche photodetectors (not shown). Light receiving unit 3 is then read out by microprocessor 6. The LIDAR measured data thus obtained are then analyzed by microprocessor 6 in order to recognize, among other things, contamination 5a, 5b, if present.

In the present example, a first contamination 5a is situated on a section of beam path 4 situated within LIDAR system 1. More precisely, first contamination 5a is located on a surface of beam forming unit 9 facing mirror 8. A second contamination 5b is situated on a section of beam path 4 situated outside LIDAR system 1. Second contamination 5b is situated here on a side of cover glass 10 facing the surroundings. The two contaminations 5a, 5b reduce the intensity of the light beam along beam path 4 and each cause an echo in the LIDAR measured data, which may be interpreted as respective contamination 5a, 5b as will also be illustrated below.

LIDAR system 1 from FIG. 1 is configured to recognize contamination 5a, 5b based on point cloud data, which have been determined from the LIDAR measured data. The point cloud data were previously normally used only for obtaining pieces of depth information about the surroundings, and gain an additional function through the present invention.

Figure 2:
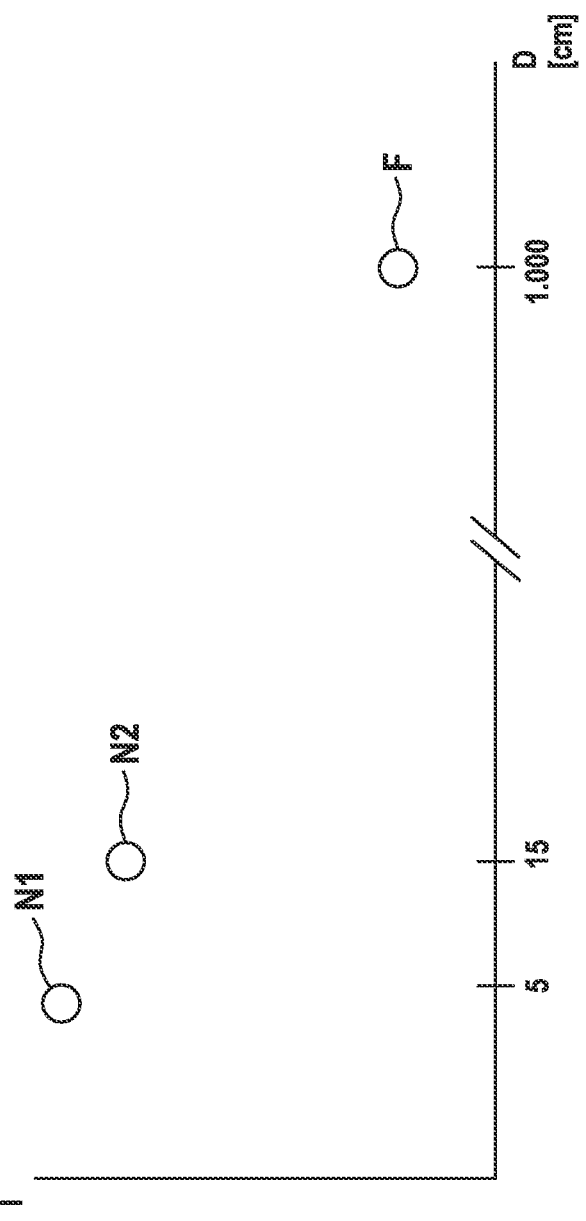
FIG. 2 schematically shows a diagram of a point cloud, which has been recorded by the LIDAR system in FIG. 1.

FIG. 2 schematically shows a diagram of a point cloud, which has been recorded by the LIDAR system in FIG. 1. The LIDAR measured data include measured far points F and near points N1, N2, near points N1, N2 being recognized within a predetermined distance from LIDAR system 1, which is shorter than a distance of far points F from LIDAR system 1, and LIDAR system 1 being configured to use near points N1, N2 in order to recognize contamination 5a, 5b. In the schematic point cloud data from FIG. 2, only two near points N1, N2 and one far point F are illustrated by way of example. Near points N1, N2 according to the point cloud data have a distance of 1 cm to 100 cm to LIDAR system 1, as will also be explained with reference to FIG. 2. LIDAR system 1 is configured to compare an optical actual transmittance based on the LIDAR measured data with an optical setpoint transmittance in order to recognize contamination 5a, 5b. For this purpose, a setpoint data set of a calibration with a clean beam path 4, in particular, clean cover glass 10, has been stored by the manufacturer in memory 7 and microprocessor 6 is configured to compare this setpoint data set during operation with an actual data set that includes the presently received LIDAR measured data. In this way, a deviation between actual transmittance and setpoint transmittance may be recognized by LIDAR system 1, which may be classified by LIDAR system 1 as an indication of a contamination 5a, 5b of beam path 4.

In FIG. 2, a first near point N1 has been recognized by LIDAR system 1 at a distance of 5 cm and a second near point N2 has been recognized by LIDAR system 1 at a distance of 15 cm. Far point F has been recognized at a distance of 1000 cm. LIDAR system 1 or its microprocessor 6 is configured to recognize first near point N1, which is generated by first contamination 5a, as an intrinsic contamination 5a, i.e., as contamination 5a within housing 11, since its distance has been recognized to be shorter than 10 cm. LIDAR system 1 or its microprocessor is further configured to recognize second near point N2, which is generated by second contamination 5b, as extrinsic contamination 5b, i.e., as contamination 5b outside housing 11, since its distance has been recognized to be greater than 10 cm. LIDAR system 1 or its microprocessor 6 is configured to recognize far point F, which is generated by the object in the surroundings, as an object in the surroundings, since its distance has been recognized to be 75 cm away from LIDAR system 1. LIDAR system 1 is thus configured to recognize contamination 5b, which is located on cover glass 10 of LIDAR system 1. LIDAR system 1 is further configured to recognize contamination 5a, which is located on an optical component of LIDAR system 1, namely, on beam forming unit 9 within housing 11. LIDAR system 1 is further configured to differentiate contamination 5a, 5b of beam path based on the point cloud data from an object in the surroundings, namely, by determining the measured distance between LIDAR system 1 and near points N1, N2 and between LIDAR system 1 and far points F in the point cloud data. The distances of near points N1, N2 and of far point F, which result from the point cloud data, are cited here only by way of example. Depending on beam path 4 within LIDAR system 1, the distances in the histogram may deviate upwardly or downwardly from the cited values. Therefore, the corresponding distances for each LIDAR system 1 must be determined at the outset in order to define which echoes as near points N1, N2 may be assigned to intrinsic or extrinsic contaminations 5a, 5b and which echoes as far points F may be assigned to objects in the surroundings.

Figure 3:
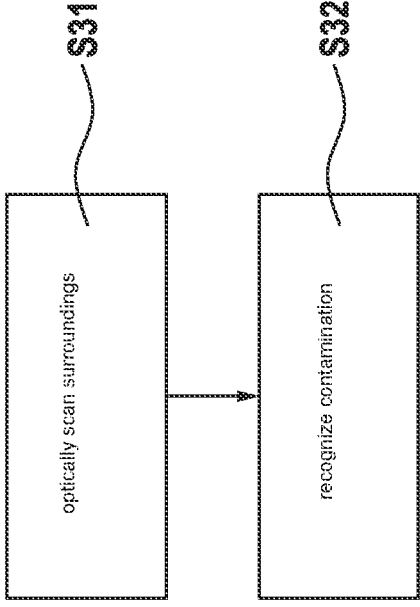
FIG. 3 shows an exemplary method according to the present invention.
Figure 3:

FIG. 3 illustrates one exemplary method according to the present invention. In step S31, LIDAR system 1 optically scans the surroundings of LIDAR system 1 in order to obtain LIDAR measured data. This means that light transmitting unit 2 scans the surroundings using light, for example, infrared laser light, and light receiving unit 3 receives back the light reflected in the surroundings in order to obtain the LIDAR measured data. In step S32, LIDAR system 1 recognizes contamination 5a, 5b based on the LIDAR measured data. This may include a determination by LIDAR system 1 of an actual transmittance of cover glass 10 of LIDAR system 1 using near points N1, N2 from point cloud data, which have been determined from the LIDAR measured data of LIDAR system 1, in order to recognize contamination 5a, 5b, as illustrated in FIG. 2.

If, within the scope of the method, a contamination of cover glass 10 is recognized by LIDAR system 1, LIDAR system 1 in this specific embodiment is further configured to trigger cleaning device 12, specifically, often enough or long enough until second near point N2 in the point cloud data associated with the contamination is eliminated. Normally, however, LIDAR measured data are added up by LIDAR system 1 over a certain time period to form a so-called histogram, so that the point cloud data will include a plurality of second near points N2, which have a statistical deviation from one another, but are nevertheless all traceable to second contamination 5b outside on cover glass 10. The cleaning by cleaning device 12 is then prompted by microprocessor 6 normally long enough or often enough until a predetermined percentage of second near points N2 per time period is no longer present in the histogram, for example, 90% of second near points N2, relative to the highest value of second near points N2 during the LIDAR measurement. A portion of second near points N2 may also already be caused by clean cover glass 10. Here, the comparison between actual transmittance and setpoint transmittance is then necessary so that cover glass 10 is cleaned just long enough until the setpoint transmittance is achieved and not, until all second near points N2 are removed.

Figure 4:
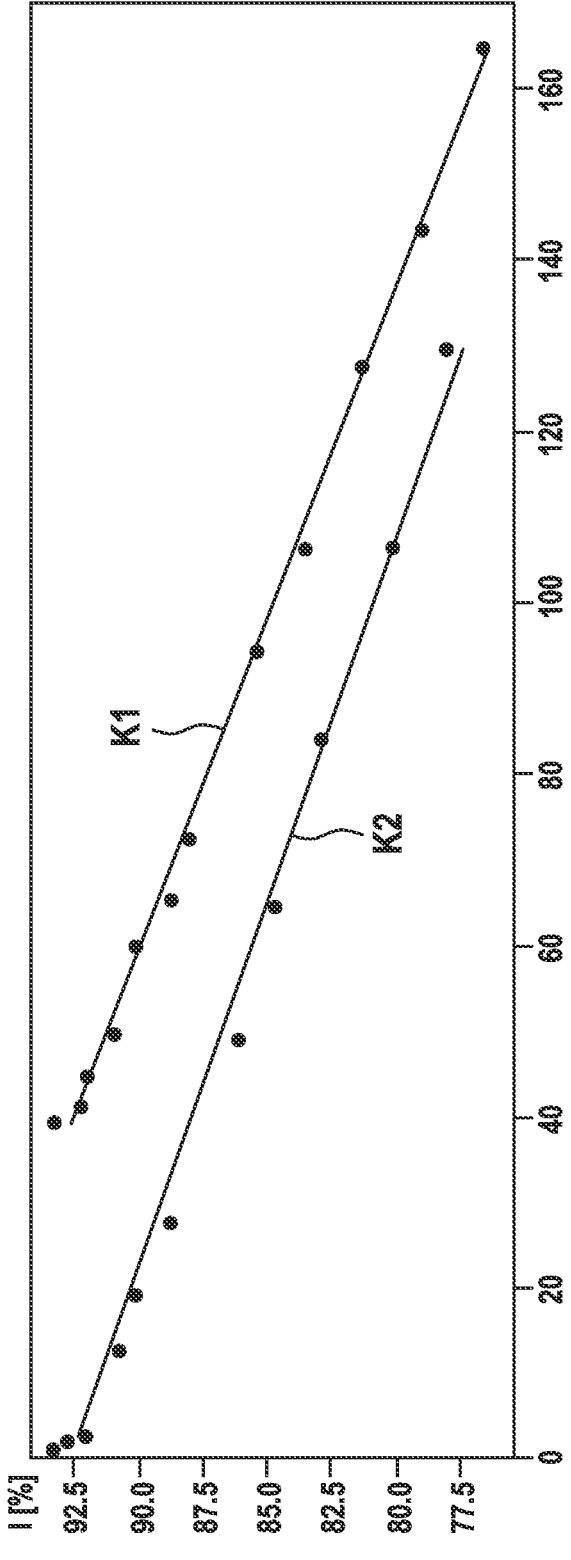
FIG. 4 shows an exemplary further diagram of a point cloud for two different cover glasses, which may be used in the LIDAR system from FIG. 1.

FIG. 4 shows one exemplary further diagram of a point cloud for two different cover glasses 10, which may be used in LIDAR system 1 from FIG. 1. Here, a first curve K1 and a second curve K2 are recorded by way of example for different cover glasses 10. The difference between the two curves K1, K2 illustrates why it is important to determine in advance the transmission characteristic of the respectively used cover glass 10. The ratio of intensity of near points divided by the number of valid points is represented in the diagram (near point ratio*average intensity of near points). This ratio may be used by LIDAR system 1 in order to recognize contamination 5a, 5b. Although the present invention has been illustrated and described in greater detail with the aid of preferred exemplary embodiments, the present invention is not limited by the described examples, and other variations may be derived therefrom by those skilled in the art without departing from the scope of protection of the present invention.

What is claimed is:

1. A LIDAR system, comprising:
a light transmitting unit;
a light receiving unit, a beam path being formed between the light transmitting unit and the light receiving unit of the LIDAR system, in order to optically scan surroundings of the LIDAR system during operation of the LIDAR system;
wherein the LIDAR system is configured to determine point cloud data including measured points based on LIDAR measured data which have been obtained during the optical scanning of the surroundings, the measured points including far points and near points, the near points being recognized within a predetermined distance from the LIDAR system shorter than a distance of the far points from the LIDAR system, and wherein the LIDAR system is configured to determine a ratio between the near points and the measured points and recognize a contamination of the beam path based on the ratio, and wherein the LIDAR system is further configured to determine a further ratio between the near points and a tile size of the LIDAR system and recognize the contamination of the beam path based on the further ratio.

2. The LIDAR system as recited in claim 1, wherein the near points according to the point cloud data have a distance of 1 cm to 100 cm to the LIDAR system.

3. The LIDAR system as recited in claim 1, wherein the contamination is situated on a section of the beam path situated within the LIDAR system.

4. The LIDAR system as recited in claim 1, wherein the contamination is situated on a section of the beam path situated outside the LIDAR system.

5. The LIDAR system as recited in claim 1, wherein the LIDAR system is configured to recognize the contamination, which is located on a cover glass of the LIDAR system.

6. The LIDAR system as recited in claim 1, wherein the LIDAR system is further configured to compare an optical actual transmittance based on the LIDAR measured data with an optical setpoint transmittance to recognize the contamination.

7. The LIDAR system as recited in claim 1, wherein the LIDAR system is further configured to recognize the contamination of the beam path based on a standard deviation of the distance of the near points to the LIDAR system.

8. A method for recognizing a contamination of a beam path of a LIDAR system, the method comprising:
determining, by the LIDAR system, point cloud data including measured points based on LIDAR measured data which have been obtained during an optical scanning of surroundings of the LIDAR system;
recognizing, by the LIDAR system from among the measured points, near points and far points, the near points being recognized within a predetermined distance from the LIDAR system shorter than a distance of the far points from the LIDAR system;
determining, by the LIDAR system, a ratio between the near points and the measured points;
determining, by the LIDAR system, a further ratio between the near points and a tile size of the LIDAR system; and
recognizing, by the LIDAR system, the contamination of the beam path based on the ratio and the further ratio.

9. The method as recited in claim 8, further comprising:
determining an actual transmittance of a cover glass of the LIDAR system by the LIDAR system using the near points from the point cloud data.

10. The method as recited in claim 8, further comprising:
recognizing, by the LIDAR system, the contamination of the beam path based on a standard deviation of the distance of the near points to the LIDAR system.

11. A LIDAR system, comprising:
a light transmitting unit;
a light receiving unit, a beam path being formed between the light transmitting unit and the light receiving unit of the LIDAR system, in order to optically scan surroundings of the LIDAR system during operation of the LIDAR system;
wherein the LIDAR system is configured to determine point cloud data including measured points based on LIDAR measured data which have been obtained during the optical scanning of the surroundings, the measured points including far points and near points, the near points being recognized within a predetermined distance from the LIDAR system shorter than a distance of the far points from the LIDAR system, and wherein the LIDAR system is configured to determine a ratio between the near points and the measured points and recognize a contamination of the beam path based on the ratio, wherein the LIDAR system is further configured to:

determine valid points and invalid points from among the measured points;

determine a second ratio between the near points and the valid points; and recognize the contamination of the beam path based on the second ratio.

12. A method for recognizing a contamination of a beam path of a LIDAR system, the method comprising:

determining, by the LIDAR system, point cloud data including measured points based on LIDAR measured data which have been obtained during an optical scanning of surroundings of the LIDAR system;

recognizing, by the LIDAR system from among the measured points, near points and far points, the near points being recognized within a predetermined distance from the LIDAR system shorter than a distance of the far points from the LIDAR system;

determining, by the LIDAR system, a ratio between the near points and the measured points; and recognizing, by the LIDAR system, the contamination of the beam path based on the ratio, the method further comprising:

determining, by the LIDAR system, valid points and invalid points from among the measured points;

determining, by the LIDAR system, a second ratio between the near points and the valid points; and recognizing, by the LIDAR system, the contamination of the beam path based on the second ratio.

* * * * *